United States Patent [19]

Hickman et al.

[11] 4,083,149
[45] Apr. 11, 1978

[54] DROP VENT WALL SYSTEM

[75] Inventors: John S. Hickman, Milwaukee; Andrew Paul Jensen, Madison, both of Wis.

[73] Assignee: Capital Steel & Supply Co., division of Jensen Investment Corporation, Madison, Wis.

[21] Appl. No.: 688,524

[22] Filed: May 21, 1976

[51] Int. Cl.² .................. E01F 13/00; E05F 11/00
[52] U.S. Cl. ........................... 49/147; 49/360; 49/404; 52/64; 52/207
[58] Field of Search ............ 49/147, 404, 360; 52/64, 72, 207; 119/21; 160/1, 90

[56] References Cited

U.S. PATENT DOCUMENTS

| 1,452,746 | 4/1923 | Lyding | 119/21 |
| 2,160,366 | 5/1939 | Marchenko | 49/360 |
| 3,154,303 | 10/1964 | Cavallero et al. | 52/64 |
| 3,429,298 | 2/1969 | Thomason | 119/21 |
| 3,511,299 | 5/1970 | Newell et al. | 160/1 |
| 3,802,479 | 4/1974 | Newell et al. | 160/1 |
| 3,915,377 | 10/1975 | Sutton, Jr. | 119/21 X |

Primary Examiner—Philip C. Kannan
Attorney, Agent, or Firm—Merriam, Marshall & Bicknell

[57] ABSTRACT

A wall system suitable for use in the ventilating of buildings which includes a vertically adjustable, drop vent, upper wall section subwall which is offset from and adapted to be raised or lowered relative to a stationary lower subwall by means of a winch and pulley arrangement.

25 Claims, 7 Drawing Figures

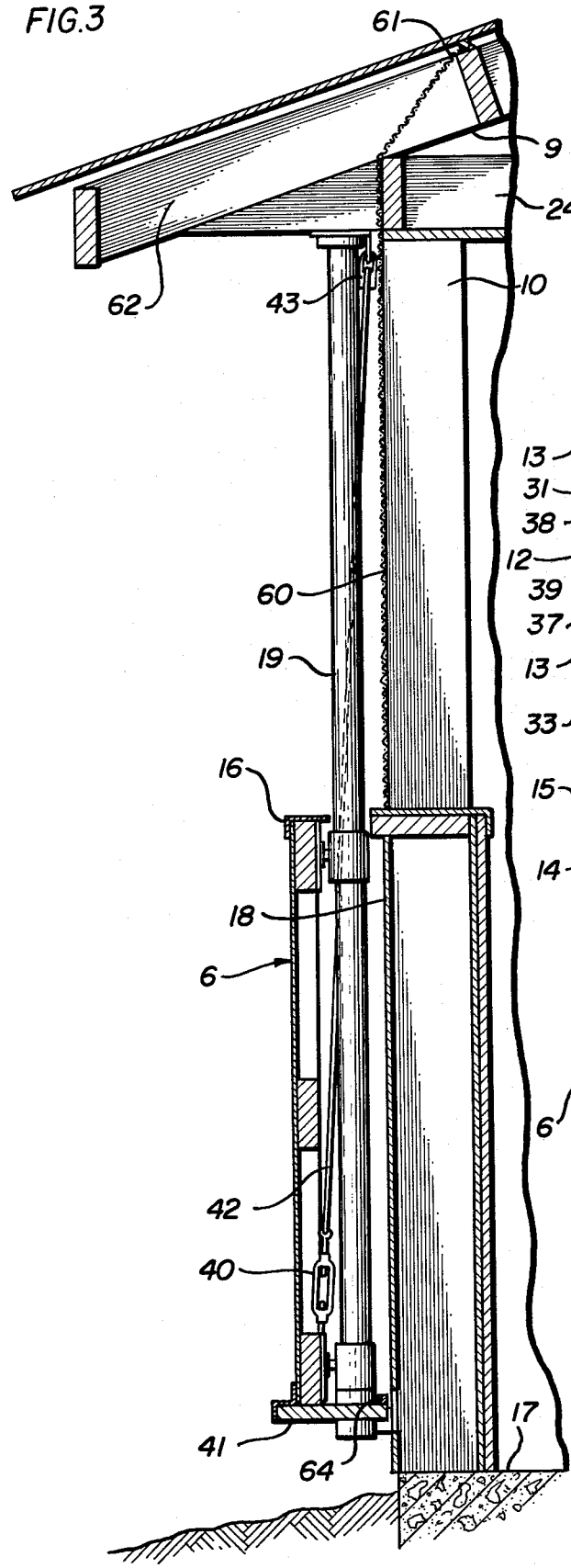
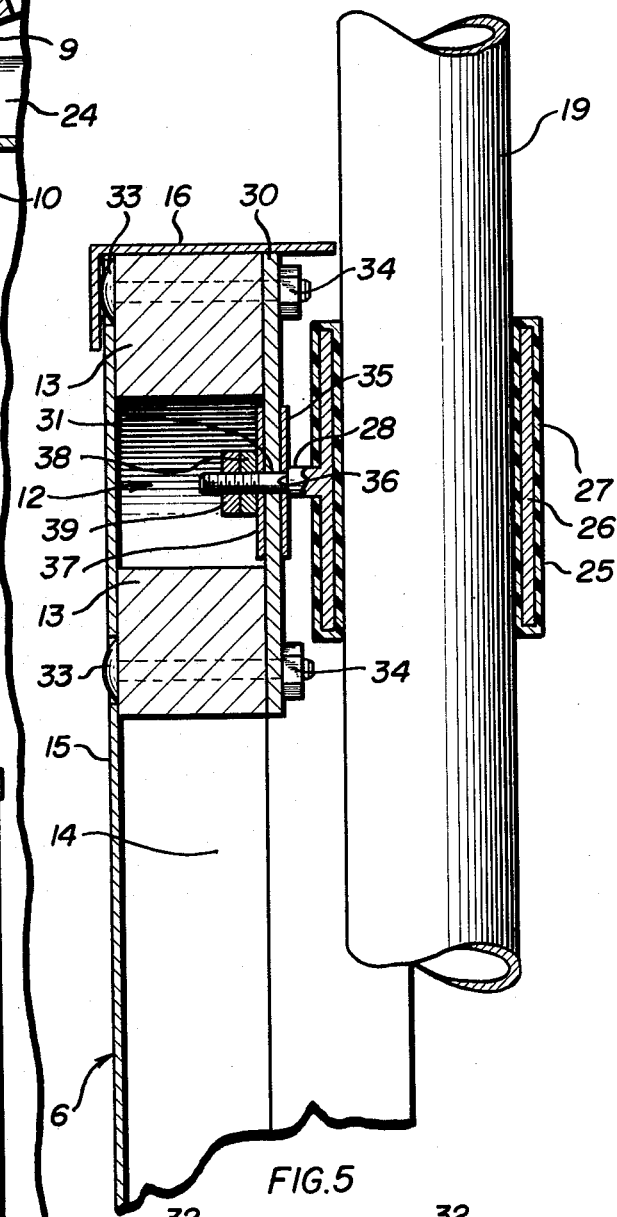
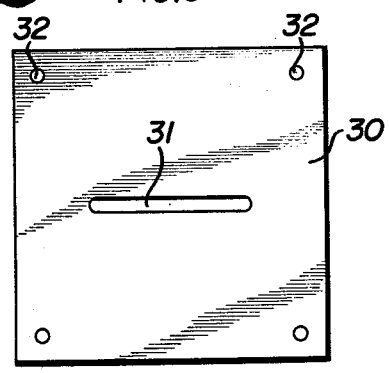

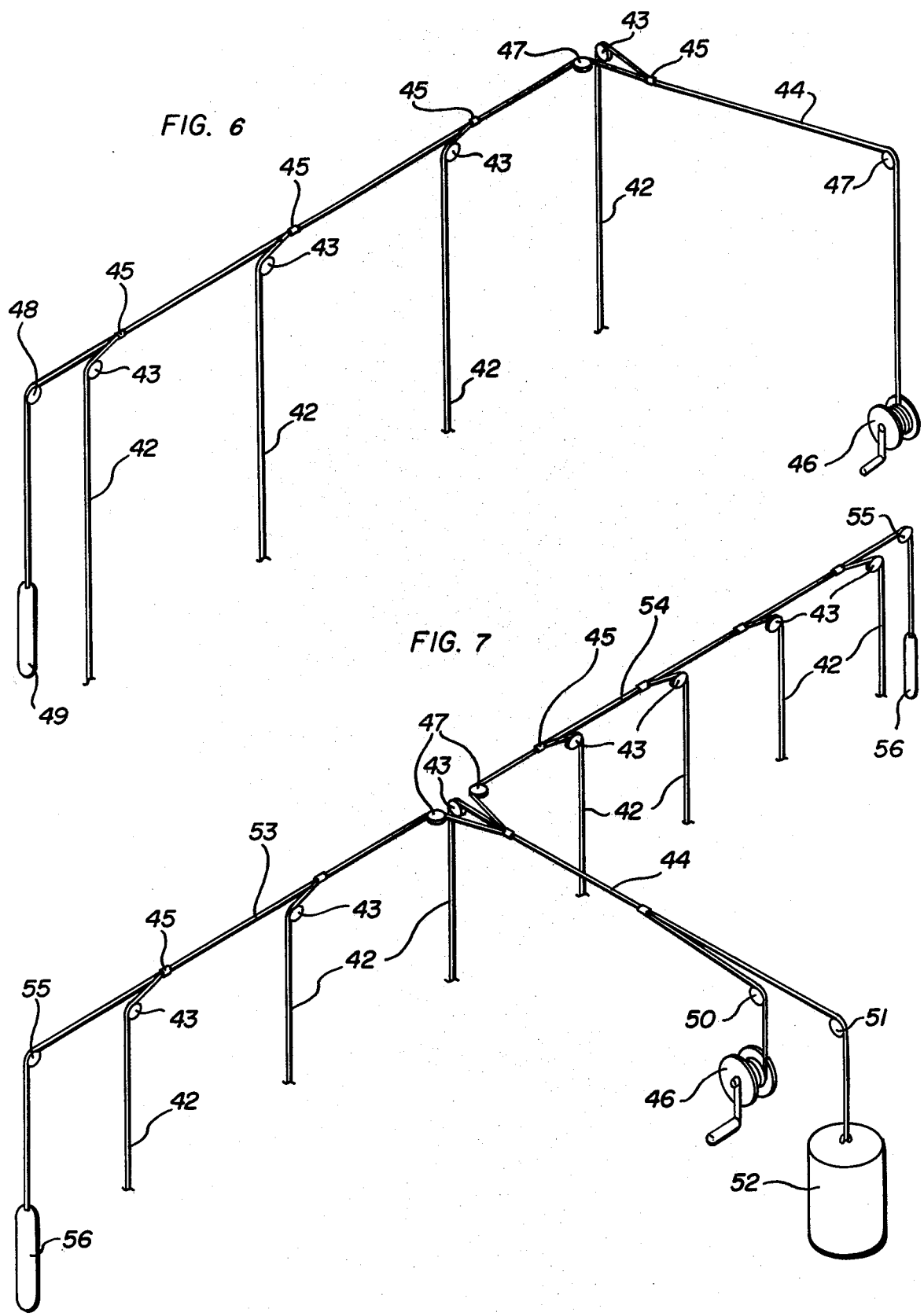

DROP VENT WALL SYSTEM

The present invention relates to an improvement in the wall structure of a farm or other building. In general, the invention disclosed and claimed herein concerns a ventilating wall system which can be used for, or in conjunction with, one or more walls of a building. More particularly, the present invention pertains to a drop vent wall system which includes a vertically adjustable wall section which can be raised or lowered for ventilating or providing a desired opening in a building.

BACKGROUND OF THE INVENTION

In the prior art, various approaches have been suggested for providing adequate ventilation to farm buildings such as dairy barns, poultry houses and the like. See, for example, U.S. Pat. Nos. 2,354,292 and 2,626,591. One approach for ventilating buildings involves the utilization of forced air ventilating systems which employ fans, blowers or other such equipment. Another approach has been to merely utilize the natural ventilation which occurs in a particular structure. The air circulating about a building is afforded one or more openings into the building so that the air can circulate within the building and ventilate it. This latter approach involves the utilization of openings of different sizes and shapes in one or more walls of the building. The openings can be adjusted to control the air circulation in the structure. Unfortunately, problems exist with systems employing natural ventilation systems. In some instances, the structures are too bulky, complex in their operation or too costly in their design. Another disadvantage that exists is that the time associated with manipulating the openings in the structure to control the ventilation is excessive.

One type of structure which is particularly important to ventilate is a farm building where cows or other animals are housed. It is important that this type of structure be properly ventilated under controlled conditions. It is especially desired to provide a building where one or more of the walls or portions thereof can be raised or lowered either to allow more air to circulate within the building or to reduce the air circulation within the structure. It is also desirable to have a structure wherein the wall or wall portion of the ventilating system can be moved relatively readily by an operator.

SUMMARY OF THE INVENTION

The invention disclosed and claimed herein involves a structure having one or more vertically adjustable subwalls or wall portions or sections which can be readily and relatively easily raised or lowered by an operator to provide openings in the structure for the circulation of air within the structure.

Briefly, the invention comprises a wall system for a building in which a lower subwall or wall portion is stationary. An upper or drop vent subwall, which is offset from the lower subwall, is adapted to move vertically relative to the lower wall on a plurality of posts spaced along the length of the upper wall. A cable and pulley arrangement connected to a manually or electrically operated winch means allows the upper subwall to be raised or lowered to the desired position on the posts.

The wall system of the present invention provides the desired amount of ventilation to a building through use of a wall structure which is relatively compact, easy for one person to operate and in which the upper subwall is adjustable relative to the lower subwall.

BRIEF DESCRIPTION OF THE DRAWINGS

The invention will be better understood from the following detailed description thereof, in conjunction with the accompanying drawings, in which:

FIG. 3 is a sectional view of the wall system of FIG. 2 with the exception that the drop vent wall is in a lowered or opened position;

FIG. 4 is an enlarged fragmentary sectional view of a collar employed in the wall system of the present invention;

FIG. 5 is an end view of a slide connector plate employed with the collar shown in FIG. 4; and, FIGS. 6 and 7 show illustrations of two embodiments of pulley system arrangements, adapted for use with the drop vent wall system of the present invention.

DETAILED DESCRIPTION

Figure 1:
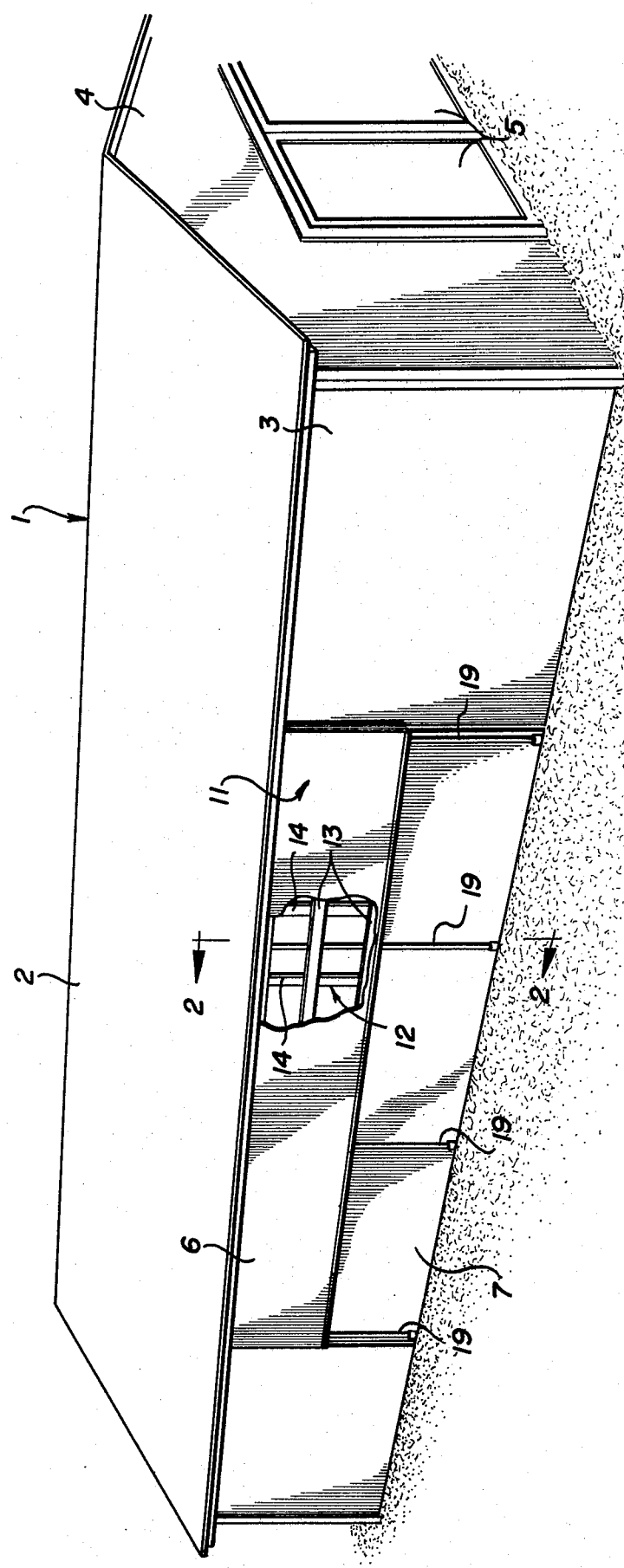
FIG. 1 shows a perspective view of a farm building employing the drop vent wall system of the present invention with a portion of the siding of the drop vent wall cut away.

Referring to the drawings, there is shown a building 1 such as a dairy or other type of farm building which houses cows or other animals. Building 1 includes a roof 2, side walls 3 and end walls 4 having doors 5. Only one side wall and end wall have been shown, but it is appreciated that the opposite side and end walls can, if desired, correspond to the side and end walls shown in FIG. 2. As seen more clearly in FIGS. 2 and 3, a plurality of truss members such as shown at 9 in FIG. 2 are each positioned on top of spaced vertical support posts or columns as illustrated at 10.

Referring to FIG. 1, it will be seen that a portion of sidewall 3 comprises the drop vent wall 11 of the present invention. Vent wall 11 includes a first or lower subwall section 7 which is stationary and a second, vertically adjustable upper subwall section 6 which is offset from lower subwall section 7. As shown in FIGS. 1 and 2, both sections 6 and 7 are constructed of conventional materials, viz., a wood frame 12 including girts 13, braces 14, a subwall face comprising corrugated metal siding 15 and door trim 16. It is appreciated that other materials of construction such as steel frame or translucent plastic or fiberglass siding could be employed instead of the metal siding.

Figure 2:
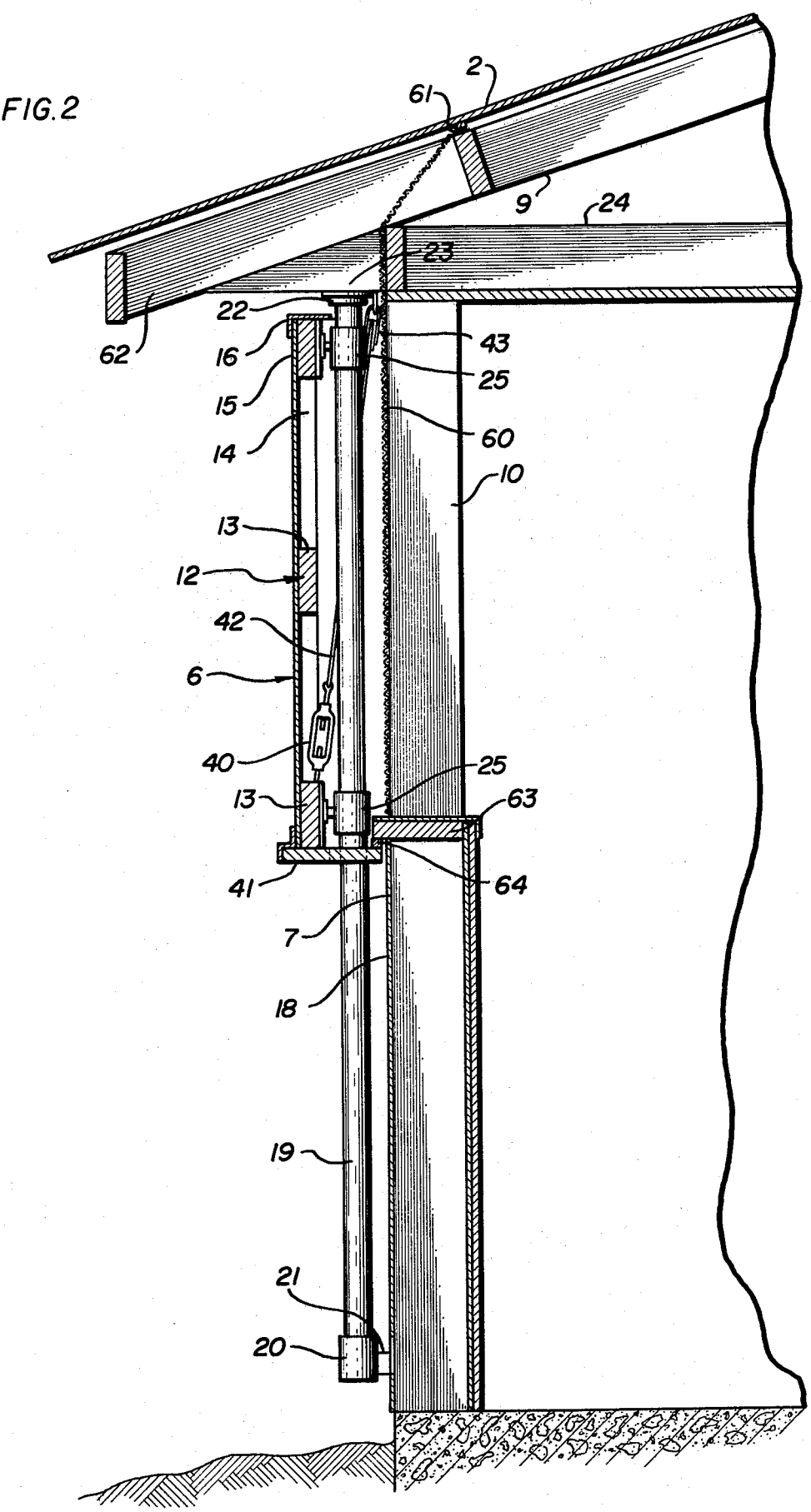
FIG. 2 shows a sectional view of the wall system of the present invention taken along lines 2—2 in FIG. 1 with the drop vent wall in a raised or closed position.

As can be seen in FIGS. 2 and 3, building 1 generally includes a foundation pier or slab 17, upon which the building's main vertical supports, posts 10, are attached or positioned.

The lower subwall sections 7 are positioned in alignment with support columns 10.

Upper subwall section 6 is shown in FIGS 1–3 as being offset from and located contiguous to the outboard wall surface 18 of lower wall section 7.

As shown in FIG. 1, from the particular embodiment illustrated, a plurality of spaced vertical posts or pipes 19 are positioned at a spaced distance from outboard wall surface or face 18. One end of each pipe 19 is placed in a cap 20 which in turn is fixedly secured at 21 to fixed lower subwall section 7. The opposite end of post 19 is also placed in a cap 22 which in turn is fixedly attached at 23 to cross beam 24 of truss member 9.

While means for positioning the posts on pipes 19 in aligned, spaced position relative to subwall section 7 have been depicted, it is appreciated that other suitable fastening means could be utilized by one skilled in the art to properly orient pipes 19 relative to subwall section 7. Further, although the building depicted in the drawings employs four pipes or posts 19, it will be appreciated that either additional or as few as two posts 19 can be employed, depending upon the length of the drop vent wall desired. In some cases it may be desirable to have an entire wall formed for use as a drop vent wall system rather than only a portion of the sidewall as shown in FIG. 1.

Each post 19 is provided with at least a pair of slidable collars 25. Two collars 25, disposed on post 19, are connected by suitable fastening means to the upper and lower portions of frame 12 of upper subwall section 6.

As illustrated in FIG. 4, in a preferred embodiment of the present invention, each collar 25 includes a metal sleeve 26 provided with a plastic coating 27. The plastic coating, which can be 12-15 mils thick in certain applications, serves to reduce friction between collar 25 and post 19 and obviates any need for other lubrication of collar 25. The coating can be a "Teflon" or "Nylon" polymeric material. Each collar sleeve 26 has an inside diameter slightly larger than the outside diameter of posts 19.

Collar 25 has a fixed threaded stud 28 which extends outwardly from the collar sleeve 26. Stud 28 is adapted to be connected to a slider plate 30.

Slider plate 30 (FIGS. 4 and 5) is a flat plate provided with a horizontal slot 31 and a plurality of bolt holes 32. Plate 30 is fastened to frame 12 of wall section 6 by means of bolts 33 which pass through girt 13 of frame 12 and holes 32 of plate 30. The connection is completed when nuts 34 are drawn up on bolts 33 as shown in FIG. 4. In assembling slider plate 30 to a collar 25 on post 19, a washer member 35 is placed on threaded stud 28 until it contacts stud seat 36. Additional spacers or collars (not shown) can be installed between stud seat 36 and washer 35 to shim wall section 6 into better vertical alignment. Stud 28 is inserted into slot 31 of plate 30, and a second washer member 37 is placed on stud 28 after which nut 38 and lock nut 39 are fastened to stud 28 to complete the assembly of the collar and slide plate, whereby subwall section 6 is horizontally slidably mounted relative to vertically slidable collars 25 on vertical posts 19.

A pulley arrangement serves to raise and lower wall section 6 on posts 19. Referring to FIG. 2, a screw eye or other suitable connector, not shown, fastens turnbuckle 40 to girt 13 or the bottom part 41 of subwall section 6. Preferably the cable adjusting turnbuckles 40 are fastened to subwall section 6 at spaced locations along the wall section with each turnbuckle being located near a post 19.

A cable 42 has one end fastened to turnbuckle 40. The cable extends upward where it wraps about a pulley 43 which depends from and is connected to cross beam 24. As shown in FIGS. 6 and 7, the remaining end of cable 42 is connected to main cable 44 at a predetermined location 45 to keep tension on cable 42 at all times.

In the pulley arrangement of FIG. 6, main cable 44 has one end wrapped about winch 46. The cable extends upward where it wraps about a plurality of pulleys 47, each of which depends from and is connectd to a suitable ceiling cross beam. Cable 44 extends along the length of wall section 6 where it then wraps about pulley 48. The remaining end of cable 44 is connected to a counterweight 49 which serves to keep tension on cable 44 at all times.

When subwall section 6 is to be raised or lowered, winch 46, which can be either manually or electrically operated, is actuated whereby, in the case of raising subwall section 6, cable 44 is wrapped about winch 46. As cable 44 is drawn back toward winch 46, cables 42 are pulled upward, which in turn raises wall section 6 on posts 19 (FIG. 2). When it is desired to lower wall section 6 relative to fixed subwall section 7, the operation is reversed. Cable 44 moves in a direction away from winch 46 and cables 42 move downward along with wall section 6 (FIG. 3). One operation can actuate winch 46 and move subwall section 6 to the desired location for ventilating purposes.

The pulley arrangement of FIG. 7 operates in somewhat the same manner as the pulley arrangement illustrated in FIG. 6, however, in FIG. 7 a cable 50, having one end fastened to winch 46, is attached at its remaining end to main cable 44. One end of cable 44 is wrapped about pulley 51 after which it is fastened to counterweight 52. The remaining end of cable 44 branches outward into cable branches 53 and 54. Cable branches 53, 54 are wrapped about pulleys 47 and each branch extends along the length of wall section 6 where it passes over pulley 55. A counterweight 56 is attached to the remaining ends of cable branches 53, 54. Actuation of winch 46 in the pulley arrangement shown in FIG. 7 will cause cable 44, in the case where wall section 6 is to be raised, to move toward pulley 51. Branches 53 and 54 will be pulled toward cable 44, the weight 56 moving upward while weight 52 moves downward. At the same time cables 42, connected to wall section 6, will move upward causing subwall section 6 to move vertically upward on posts 19. The operation is reversed to lower subwall section 6.

Referring to FIG. 2, a wire mesh screen 60 is fastened to truss member 9 at 61 and extends downward where it is suitably connected to lower subwall section 7. Screen 60 serves to cover the area exposed when upper subwall section 6 has been moved to the lowered position shown in FIG. 3. The screen serves to keep bugs and other undesirable materials from entering building 1 and is particularly desirable where a building has an open soffit such as shown at 62. It is appreciated that the screen need not be utilized in all applications.

It will be observed, referring to FIG. 2, that the bottom part 41 of subwall section 6 overlaps the top part 63 of section 7. Insulating material 64, such as a closed cell polyurethane material, can be placed on bottom part 41 so that when upper subwall section 7 is in the closed position shown in FIG. 2, insulating material 64 will prevent drafts from blowing through the seam between the bottom part 41 and top part 63 of subwall sections 6 and 7.

It is appreciated that one embodiment of a building employing the drop vent wall system of the present invention has been shown and that the invention is adapted for use with other structures. Further, while a structure for the wall sections and post connections has been illustrated, it is appreciated that it would be obvious to one skilled in the art to employ other embodiments of construction.

The foregoing detailed description has been given for clearness of understanding only, and no unnecessary limitations should be understood therefrom, as modifications will be obvious to one skilled in the art.

What is claimed is:

1. A building having a pair of end walls and a pair of side walls and a roof, said building being adapted for housing livestock, poultry and the like, wherein at least one of said building walls includes means for ventilating said building, said ventilating wall means comprising:
   a first substantially rigid subwall which extends along a substantial portion of the length of said building wall;
   a second substantially rigid subwall which extends along a substantial portion of the length of said building wall and is adapted to overlie said first subwall;
   each of said subwalls comprising a frame and a substantially rigid siding attached to said frame to form a subwall face which encloses said subwall;
   spaced substantially vertical members offset from and positioned along the length of a face of one of said subwalls;
   mounting means located contiguous to the top and bottom of at least one of said subwalls, said mounting means being joined to said vertical members whereby said mounted subwall is adapted to be moved vertically relative to said remaining subwall; and,
   means for moving said mounted subwall along said vertical members to adjustably position said mounted subwall relative to said remaining subwall whereby, when said subwalls are in a closed position, said building wall serves to preclude air from entering said building through said building wall and, when said mounted subwall is moved relative to said remaining subwall to an open position, air is permitted to enter through said building wall to ventilate said building.

2. A building in accordance with claim 1 wherein said means for moving said subwall mounted on said vertical member includes:
   a plurality of first cables each joined to said mounted subwall;
   a second, main cable disposed above said mounted subwall;
   a winch means connected to said second cable; and,
   means connecting said first cables to said second cable at predetermined locations.

3. A wall system in accordance with claim 1 wherein at least one of said subwalls has a wall portion part which overlaps a portion of the other subwall; and,
   insulating means disposed in the area of said overlapped subwalls.

4. The building of claim 1 wherein said building wall subwalls extend along the entire length of said building wall.

5. The building of claim 1 wherein said face covering for said subwalls is metal siding.

6. The building of claim 1 wherein said face covering for said subwalls is fiberglass.

7. The building of claim 1 wherein said moving means comprises pulleys and cable means connected to said movable mounted subwall for selectively, vertically raising and lowering said movable subwall.

8. The building in accordance with claim 1 wherein said mounting means further includes means for horizontally adjusting said movable subwall relative to said vertical members.

9. The building of claim 1 wherein each of said vertical members is of a length which extends substantially the maximum height of said assembled wall structure when said subwalls are in a normally closed position.

10. The building of claim 9 wherein said remaining subwall is positioned in a fixed position and serves as the bottom portion of said building wall.

11. The building of claim 1 wherein said vertical members comprise post means.

12. A building in accordance with claim 11 and further including collar means for mounting said mounted subwall on said post means.

13. A building in accordance with claim 2 wherein:
   said collar means comprises a sleeve having an inside diameter greater than the diameter of said post means;
   and said collar means is coated with a lubricating material.

14. The building in accordance with claim 12 wherein said mounting means further includes means for providing horizontal adjustment between said movable subwall and said collar means.

15. A building wall adapted for use with a building adapted for housing livestock, poultry and the like, wherein said building wall includes ventilating means for ventilating said building, said wall comprising:
   a first substantially rigid subwall;
   a second substantially rigid subwall which is adapted to overlie said first subwall;
   each of said subwalls comprising a frame and a substantially rigid siding attached to said frame to form a subwall face which encloses said subwall;
   vertical members adapted to be spaced from each other and offset from and positioned in a substantially vertical position along the length of a face of one of said subwalls when said building wall is in an erected position;
   mounting means located contiguous to the top and bottom of at least one of said subwalls, said mounting means being adapted to be joined to said vertical members whereby, upon erection of said building wall, said mounted subwall is adapted to be moved vertically relative to said remaining subwall; and,
   means adapted to be connected to said mounted subwall for moving said mounted subwall along said vertical members to adjustably position said mounted subwall relative to said remaining subwall whereby, upon assembly, when said subwalls are in a closed position, said building wall serves to preclude air from passing through said building wall and, when said mounted subwall is moved relative to said remaining subwall to an open position, air is permitted to enter through said building wall to ventilate a building.

16. A wall in accordance with claim 15 wherein said subwall facings comprise metal siding.

17. A wall in accordance with claim 15 wherein said vertical members comprise post means.

18. A wall in accordance with claim 15 wherein said moving means includes pulley and cable means for raising and lowering the subwall adapted to be mounted on said vertical members.

19. A building wall in accordance with claim 15 wherein each of said vertical members is of a length which corresponds to substantially the maximum height of said assembled wall structure when said subwalls are in a normally closed position.

20. A building wall in accordance with claim 15 wherein said the face of each subwall comprises fiberglass.

21. A building wall in accordance with claim 15 wherein said mounting means further includes means for horizontally adjusting said mounted subwall relative to said vertical members.

22. A building wall in accordance with claim 15 and further including collar means for mounting said mounted subwall on said vertical members and said mounting means including means for providing horizontal adjustment between said mounted subwall and said collar means.

23. A building as defined by claim 15 wherein said pulley and cable means include counterweight means.

24. A building as defined by claim 15 wherein said collar means has a normally slippery surface.

25. A building as defined by claim 15 wherein said ventilating building wall includes a fixed screen section.

* * * * *

UNITED STATES PATENT OFFICE
CERTIFICATE OF CORRECTION

Patent No. 4,083,149     Dated April 11, 1978

Inventor(s) John S. Hickman and Andrew Paul Jensen

It is certified that error appears in the above-identified patent and that said Letters Patent are hereby corrected as shown below:

Column 7, line 2 "said" should be deleted.

Signed and Sealed this

Third Day of October 1978

[SEAL]

Attest:

RUTH C. MASON
*Attesting Officer*

DONALD W. BANNER
*Commissioner of Patents and Trademarks*